(12) United States Patent
Moshenberg (10) Patent No.: US 10,135,917 B2
(45) Date of Patent: Nov. 20, 2018

(54) SYSTEMS AND METHODS FOR ALLOCATING CUSTOMERS TO NETWORK ELEMENTS

(71) Applicant: AT&T Intellectual Property I, L.P., Atlanta, GA (US)

(72) Inventor: David Moshenberg, Long Branch, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 29 days.

(21) Appl. No.: 15/492,135

(22) Filed: Apr. 20, 2017

(65) Prior Publication Data
US 2018/0309823 A1    Oct. 25, 2018

(51) Int. Cl.
*H04L 12/26* (2006.01)
*H04L 29/08* (2006.01)
*H04L 29/06* (2006.01)

(52) U.S. Cl.
CPC ...... *H04L 67/1012* (2013.01); *H04L 65/1033* (2013.01)

(58) Field of Classification Search
CPC ......... H04L 47/10; H04L 47/35; H04L 47/30; H04L 47/32
See application file for complete search history.

(56) References Cited

U.S. PATENT DOCUMENTS

| | | |
|---|---|---|
| 5,533,009 A | 7/1996 | Chen |
| 6,049,526 A | 4/2000 | Radhakrishnan et al. |
| | (Continued) | |

FOREIGN PATENT DOCUMENTS

EP    0977457 A2    2/2000

OTHER PUBLICATIONS

Kim et al.; "Virtual Network based Autonomic Network Resource Control and Management System"; IEEE Globecom; 2005; p. 1075-1079.
(Continued)

*Primary Examiner* — Siren Wei
(74) *Attorney, Agent, or Firm* — Baker & Hostetler LLP (57) ABSTRACT

A method and system for allocating customers in a network includes (a) in a network having a set of N sites, determining a value of N; (b) determining a number of demand requests to be provisioned in the network; (c) determining a currently available capacity of each site of the set of N sites; (d) determining a number of site failures M to be tolerated; (e) Setting a value for a variable X corresponding to a number of sites equal to M+1 where X≤N; (f) identifying a topology $T_x$ comprising X sites; (g) calculating a number of concurrent demand requests to be provisioned on each of the X site; and (h) identifying for the topology $T_x$ a subset $S_x$ of the set of N sites having available capacity to provision the number of demand requests to be provisioned on each site. if X<N, incrementing X by one and repeating steps (f) though (h). if X is equal to N then selecting the subset $S_x$ corresponding with a largest value of X as allocable sites for the demand requests to be provisioned; and provisioning the number demand requests to be provisioned on each site to each of the allocable sites.

20 Claims, 5 Drawing Sheets

(56) References Cited

U.S. PATENT DOCUMENTS

| | | |
|---|---|---|
| 6,144,661 A | 11/2000 | Katsube et al. |
| 7,173,907 B1 | 2/2007 | Weber et al. |
| 7,623,548 B2 | 11/2009 | Gilmartin |
| 7,733,891 B2 | 6/2010 | Reynolds et al. |
| 8,094,647 B2 | 1/2012 | Elliott et al. |
| 8,194,646 B2 | 6/2012 | Elliott et al. |
| 8,223,654 B2 | 7/2012 | Bugenhagen |
| 8,228,791 B2 | 7/2012 | Bugenhagen et al. |
| 8,442,030 B2 | 5/2013 | Dennison |
| 9,141,169 B2 | 9/2015 | Overcash et al. |
| 9,497,235 B2 | 11/2016 | Kim et al. |
| 2002/0131368 A1 | 9/2002 | Raftelis et al. |
| 2003/0133410 A1 | 7/2003 | Kang et al. |
| 2003/0200317 A1 | 10/2003 | Zeitak et al. |
| 2007/0258363 A1 | 11/2007 | Wu et al. |
| 2008/0037553 A1 | 2/2008 | Gilmartin et al. |
| 2014/0079207 A1 | 3/2014 | Zhakov et al. |
| 2014/0244808 A1 | 8/2014 | Axelrod et al. |
| 2016/0087846 A1* | 3/2016 | Prasad ............... H04L 41/0806 398/45 |
| 2016/0373575 A1 | 12/2016 | Presta et al. |
| 2016/0381146 A1 | 12/2016 | Zhang et al. |
| 2018/0054396 A1* | 2/2018 | Moore ................. H04L 47/803 |

OTHER PUBLICATIONS

Santoni et al.; "Resource Matching in a Peer-to-Peer Computational Framework"; Int'l Conf. on Internet Computing; 2007; 7 pages.

Quttoum et al.; "ARMM: An Automatic Resource Management Mechanism for Virtual Private Networks"; IEEE Consumer Communications and Networking Conf.; 2010; 6 pages.

Leong et al.; "Optimal Resource Allocation and Adaptive Call Admission Control for Voice/Data Integrated Cellular Networks"; IEEE Transactions on Vehicular Technology; vol. 55 No. 2; Mar. 2006; p. 654-669.

Cheng et al.; "Efficient resource allocation for policy-based wireless/wireline interworking"; Journal Mobile Networks and Applications; vol. 11 Issue 5; Oct. 2006; p. 661-679.

* cited by examiner

| | |
|---|---|
| Number of sites | 12 |
| Concurrent Calls needed | 5,000 |
| Site failures tolerated | 2 |

Table 1

| | vTSBC1 | vTSBC2 | vTSBC3 | vTSBC4 | vTSBC5 | vTSBC6 | vTSBC7 | vTSBC8 | vTSBC9 | vTSBC10 | vTSBC11 | vTSBC12 |
|---|---|---|---|---|---|---|---|---|---|---|---|---|
| Total Capacity | 28,700 | 28,700 | 28,700 | 28,700 | 49,200 | 32,800 | 24,600 | 28,700 | 41,000 | 49,200 | 41,000 | 20,500 |
| Available Capacity | 6,000 | 175 | 125 | 11,475 | 25 | 2,775 | 4,875 | 175 | 875 | 875 | 7,875 | 8,875 |

Table 2

| Max Topology Allowed (X) | 2 | 3 | 4 | 5 | 6 | 7 | 8 | 9 | 10 | 11 | 12 |
|---|---|---|---|---|---|---|---|---|---|---|---|
| Concurrent calls to be provisioned at each site | N/A | 5,000 | 2,500 | 1,666 | 1,250 | 1,000 | 833 | 714 | 625 | 555 | 500 |
| Usable vTSBC sites | 0 | 4 | 6 | 6 | 6 | 6 | 8 | 8 | 8 | 8 | 8 |

Table 3

FIG. 5

SYSTEMS AND METHODS FOR ALLOCATING CUSTOMERS TO NETWORK ELEMENTS

TECHNICAL FIELD

This disclosure relates generally to cloud computing and more particularly to allocating customers to network elements a way that provides additional service-reliability.

BACKGROUND

To achieve a high service level reliability goal (e.g. 99.999%) in an integrated cloud environment, redundant service nodes are necessary. Redundancies may be achieved with a variety of topologies (also referred to as N:K topologies). Allocating Customers to a virtual Trunking Session Border Controller (vTSBC) in an integrated cloud environment has serious limitations. The integrated cloud environment, being new, does not have the high service level reliability required of a service-provider. To increase service-reliability, the network operator may add additional capacity which leads to excessive over-provisioning. Additionally, only single-failure scenarios are typically entertained. Now with integrated cloud as the environment of choice, a double-failure scenario must be considered. However, as time progresses the reliability of integrated cloud will increase. At that time, the solution proposed, will facilitate moving customers from a double to single failure topology.

There is a need to reduce the over-provisioned capacity, and to increase service reliability, and topological flexibility when allocating customers to network element. There is also a need to provide an allocation of customers that tolerates single or double failure scenarios, and that allows moving between these two scenarios transparently (from a customer's point of view). There is also a need to adjust customer allocation capacity via topology changes.

SUMMARY

The problems associated with current approaches to allocate customers to network elements are overcome by providing a more efficient means of allocation. This is achieved by implementing a method including: (a) in a network having a set of N sites, determining a value of N; (b) determining a value CC for the number of concurrent demand requests to be provisioned in the network; (c) determining a currently available capacity of each site of the set of N sites; (d) determining a number M corresponding to the number of site failures to be tolerated; (e) setting a value for a variable X corresponding to a number of sites equal to M+1 where $X \leq N$; (f) identifying a topology $T_x$ including X sites; (g) calculating a value Y corresponding to the number of concurrent demand requests to be provisioned on each of the X sites where $Y=CC/(X-M)$; (h) identifying for the topology $T_x$ a subset $S_x$ of the set of N sites having available capacity to provision Y concurrent demand requests; (i) if $X<N$, incrementing X by one and repeating steps (f) though (h); (j) if X is equal to N then selecting the subset $S_x$ corresponding with a largest value of X as allocable sites for the Y concurrent demand requests; and (k) provisioning the number demand requests to be provisioned on each site to each of the allocable sites. Other embodiments of this aspect include corresponding computer systems, apparatus, and computer programs recorded on one or more computer storage devices, each configured to perform the actions of the methods.

One general aspect includes a system including: a processor, a computer-readable medium in communication with the processor where the processor is configured to execute an application stored in the computer-readable medium for performing operations including: (a) in a network having a set of n sites, determining a value of N. The system also includes (b) determining a number CC of concurrent demand requests to be provisioned in the network and (c) determining a currently available capacity of each site of the set of N sites. The system also includes (d) determining a number of site failures M to be tolerated. The system also includes (e) setting a value for a variable X corresponding to a number of sites equal to M+1. The system also includes (f) identifying a topology $T_x$ including X sites. The system also includes (g) calculating the number Y corresponding to the number of concurrent demand requests to be provisioned on each of the X sites where $Y=CC/(X-M)$. The system also includes (h) identifying for the topology $T_x$ a subset $S_x$ of the set of N sites having available capacity to provision Y concurrent demand requests. The system also includes (i) if $X<N$, incrementing X by one and repeating steps (f) though (h). The system also includes (j) if X is equal to N then selecting the subset $S_x$ corresponding with a largest value of X as allocable sites for the Y concurrent demand requests. The system also includes (k) provisioning the Y concurrent demand requests to each of the allocable sites. Other embodiments of this aspect include corresponding computer systems, apparatus, and computer programs recorded on one or more computer storage devices, each configured to perform the actions of the methods.

One general aspect includes a non-transitory computer readable medium including computer executable instructions embodied in a computer readable medium and when executed by a processor of a computer performs steps including: (a) in a network having a set of N sites, determining a value of N; (b) determining a number CC of demand requests to be provisioned in the network; (c) determining a currently available capacity of each site of the set of N sites; (d) determining a number of site failures M to be tolerated; (e) setting a value for a variable X corresponding to a number of sites equal to M+1 where $X \leq N$; (f) identifying a topology $T_x$ including X sites; (g) calculating a number Y of concurrent demand requests to be provisioned on each of the X sites where $Y=CC/(X-M)$; (h) identifying for the topology $T_x$ a subset $S_x$ of the set of N sites having available capacity to provision the Y demand requests; (i) if $X<N$, incrementing X by one and repeating steps (f) though (h); (j) if X is equal to N then selecting the subset $S_x$ corresponding with a largest value of X as allocable sites for the demand requests to be provisioned; and (k) provisioning the number demand requests to be provisioned on each site to each of the allocable sites.

BRIEF DESCRIPTION OF THE DRAWINGS

A better understanding of the invention may be obtained from a consideration of the detailed description hereinafter taken in conjunction with the drawings which are briefly described below.

DETAILED DESCRIPTION OF ILLUSTRATIVE EMBODIMENTS

Glossary

Integrated cloud Site—A location where one or more integrated cloud Zones are present.

Integrated cloud Zone—Integrated cloud Zone is the common term for a collective set of integrated cloud hardware managed as a single unit in an integrated cloud site. Components within a single integrated cloud Zone may be managed by one or two Local Control Plane (LCP). Each LCP is an OpenStack Region with its own OpenStack APIs and Contrail Controllers/APIs.

LCP Region or OpenStack Region—'Region' is used for an OpenStack/LCP Set. A Region is a single control plane environment consisting of a set of Control servers, VMs, and Control Applications, including OpenStack, ECOMP, etc., and the managed components, including servers, switches, and storage. For clarification, there is no proximity requirement for the managed components—two compute servers in the same rack, connected to the same leaf switches, can be managed by different Regions. Early OpenStack Regions were implemented with a 1-1 mapping of a Region to a Zone/Node. Today, multiple local Regions can function within an integrated cloud Zone.

Availability Zone (AZ)—LCP Region can have one or more Availability zones. An Availability Zone is a nova configuration item. Availability groups intend to support higher availability for guest VMs through logical partitioning of servers/racks. Two AZs will be created within an LCP region for resiliency needs.

vTSBC-Site—vTSBC-Site is equivalent to an LCP Region within an integrated cloud Zone. A vTSBC can be deployed in a vTSBC-Site to enable sufficient survivability attributes. An integrated cloud Zone may accommodate two or more vTSBCs—one in each LCP Region.

N—The number of vTSBC-Sites (i.e. meaning independent vTSBC per LCP Region) that are needed to support a customer. N can assume the values of 2, 3, 4 . . . n.

K—The number of vTSBCs which are deployed within all Availability Zones (AZ) within a vTSBC-Site (i.e. within LCP region). To further clarify, if a second vTSBC is deployed within the same vTSBC-Site the K count (per vTSBC-site) is incremented by 1 regardless of the AZ it was deployed in. In this case K will equal to 2.

CAM—Customer Allocation Methodology. This methodology provides a very efficient way of allocating customer's Concurrent Calls (CC) count to a network of vTSBCs.

ECAM—Enhanced CAM. A methodology assuring that no two vTSBCs within the same LCP region (i.e. vTSBC-Site) will be allocated to the same customer.

To achieve the Service Level reliability goal of minimum 99.999% reliability in the integrated cloud redundant service nodes are necessary. There are various topologies that could be used, and collectively these topologies are known as N:K topologies.

Figure 1:
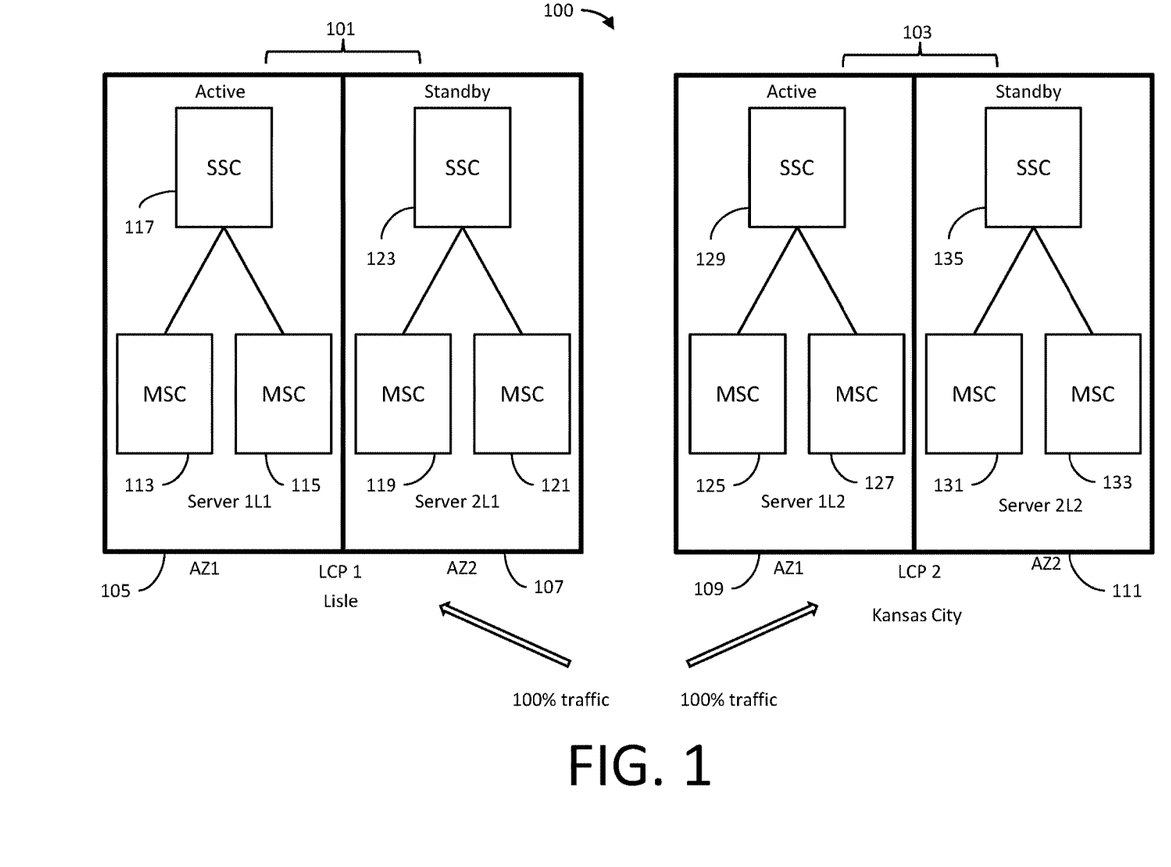
FIG. 1 is a block diagram of a 2:1 topology.

Shown in FIG. 1 is an example of a 2:1 topology, were N=2, and K=1. Illustrated in FIG. 1 is a diagram of a 2:1 topology 100. In this example there are two network elements, for example vTSBC-Sites, (the Lisle site, vTSBC site 101 and the Kansas City site, vTSBC site 103) hence N=2, and the number of vTSBCs shown per vTSBC-Site is one, hence K=1. vTSBC site 101 corresponds to LCP 1 and vTSBC site 103 corresponds to LCP 2. Each LCP has two availability zones (AZ), AZ 1 and AZ 2. vTSBC site 101 may be provided with two servers server 1L1 105 and server 2L1 107. Similarly vTSBC site 103 may be provided with two servers, server 1L2 109 and server 2L2 111. Server 1L1 105 may be provided with a pair of mobile switching centers (MSC), MSC 113 and MSC 115, and a sector switching center (SSC), SSC 117. Server 2L1 107 may be provided with MSC 119, MSC 121 and SSC 123. Similarly, Server 1L2 109 may be provided with MSC 125, MSC 127 and SSC 129, and Server 2L2 109 may be provided with MSC 131, MSC 133 and SSC 135.

Traffic allocation is performed to achieve a minimum of 99.999% reliability goal. To address a single failure the redundant site needs to be able to carry all the customer traffic. In the 2:1 topology scenario, vTSBC site 103 must be able carry all the traffic that vTSBC site 101 can. This results in an over-provisioning of 100%. This topology can tolerate single-failure.

Figure 2:
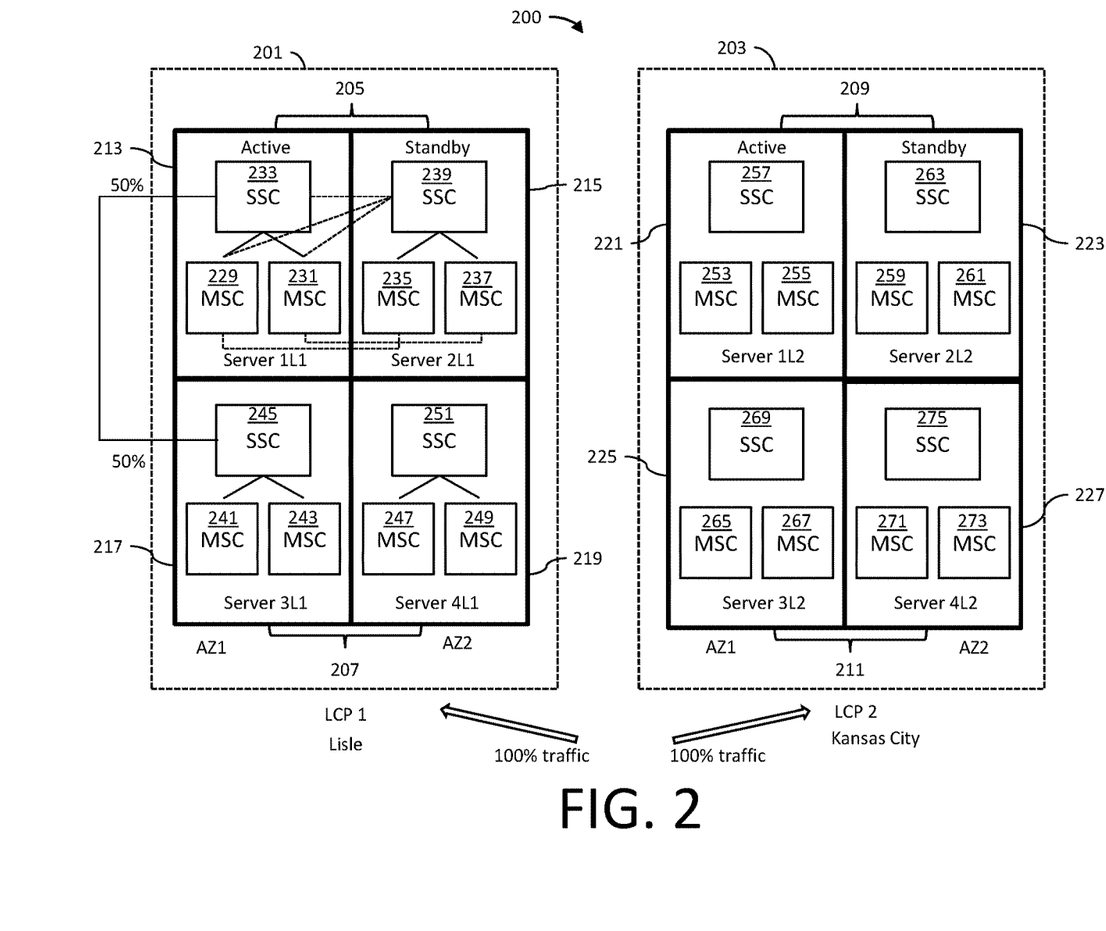
FIG. 2 is a block diagram of a 2:2 topology.

FIG. 2 illustrates a 2:2 topology 200 where N=2 and K=2. Generally speaking topologies with K>1 are not recommended, as they lead to multiple Network Element failure whenever a single site fails. To further clarify:

To have two vTSBCs in different AZs but same LCP adds capacity but not reliability. When an LCP region fails all AZs within that region may be affected.

Maintenance considerations of AIC nodes call for upgrading one LCP region at a time. Again, all AZs in the same LCP region can be affected simultaneously.

Both scenarios lead to multiple vTSBC loss when an LCP region is affected.

In this example there are two LCP, (the Lisle site, LCP1 site 201 and the Kansas City site, LCP2 site 203) hence N=2. LCP site 201 has two vTSBC sites 205 and 207. LCP site 203 has two vTSBC sites 209 and 211. vTSBC site 205 has two servers, server 1L1 213 and server 2L1 215. vTSBC site 207 has two servers, server 3L1 217 and server 4L1 219. vTSBC site 209 has two servers, server 1L2 221 and server 2L2 223. vTSBC site 207 has two servers, server 3L2 225 and server 4L2 227. Server 1L1 213 may be provided with MSC 229, MSC 231 and SSC 233. Server 2L1 215 may be provided with MSC 235, MSC 237 and SSC 239. Server 3L1 217 may be provided with MSC 241, MSC 243 and SSC 245. Server 4L1 215 may be provided with MSC 247, MSC 249 and SSC 251. Server 1L2 221 may be provided with MSC 253, MSC 255 and SSC 257. Server 2L2 223 may be provided with MSC 259, MSC 261 and SSC 263. Server 3L2 225 may be provided with MSC 265, MSC 267 and SSC 269. Server 4L2 227 may be provided with MSC 271, MSC 273 and SSC 275.

Figure 3:
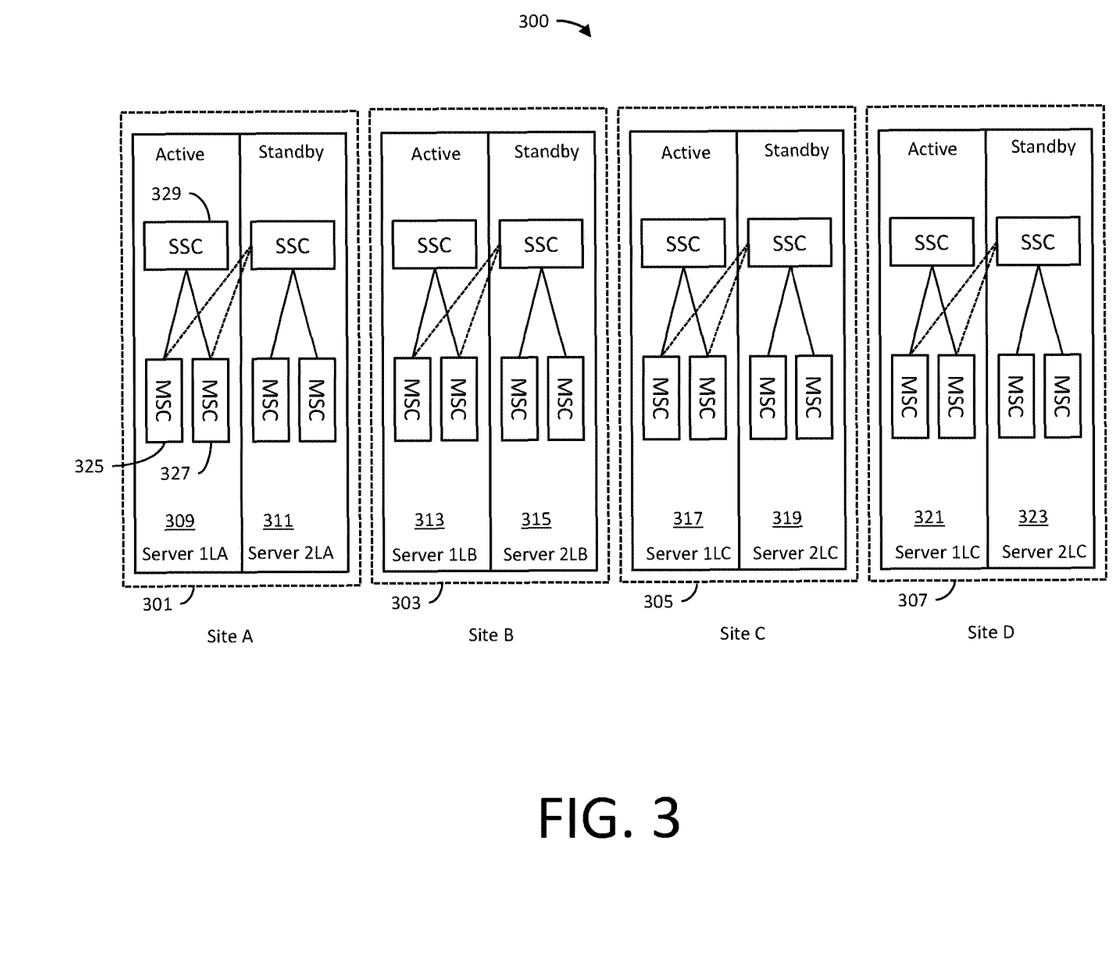
FIG. 3 is a block diagram of a 4:1 topology.

FIG. 3 Illustrates a 4:1 topology. In this example there are four sites (i.e. N=4), Site A 301, Site B 303, Site C 305 and Site D 307. Each site may have a pair of servers. For example: Site A may have server 309 (1LA) and server 311 (2LA); Site B may have server 313 (1LB) and server 315 (2LB); Site C may have server 317 (1LC) and server 319 (2LC); and Sited D may have server 321 (1LD) and server 323 (2LD). Each server may be provided with a pair of MSCs (e.g. MSC 325 and MSC 327 for server 309) and an SSC (e.g. SSC 329 for server 309). This topology is an expansion of the 2:1 topology described above. Customer traffic may be allocated across all 4 vTSBC-Sites. In steady-state each vTSBC-Site carries 25% of the traffic. However, each vTSBC-Site will be provisioned to support 33% of the traffic. The efficiency of this topology is vastly improved over the 2:1 topology. Here the over-provisioning results in 33% of customer's traffic. In the 2:1 model the over-provisioning is 100%. Generally speaking, the higher N the smaller over-provisioning will be. For very large N there is almost no waste.

Figure 4:
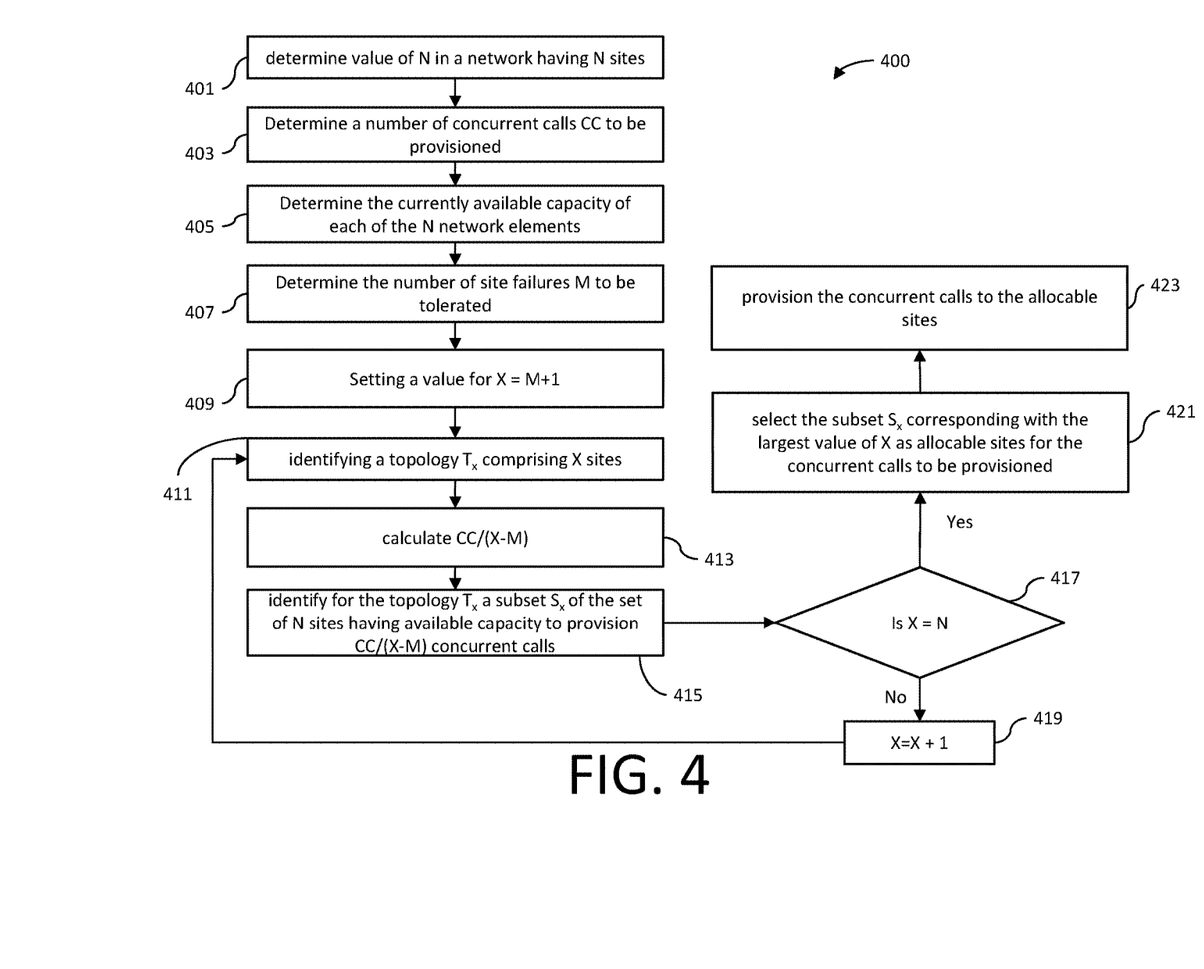
FIG. 4 is a flowchart of a method for allocating customers to network elements.

FIG. 4 is a flowchart for a method 400 for allocating concurrent demand requests such as call traffic among a plurality of network elements such as vTSBCs in a network having N sites.

In step 401 the value of N for the network is determined.

In step 403 the total concurrent number of demand requests (for example the number of total concurrent calls (CC)) is determined.

In step 405 the currently available capacity of each of the N network elements is determined. The network elements may be vTSBCs or combinations of MSCs and SSCs.

In step 407 the number (M) of site failures to be tolerated is determined. M can be any integer, but is usually limited to 1 or 2. Beyond 2 failures to be tolerated, the necessity to build spare capacity becomes impractical.

In step 409 a value for the variable X which corresponds to a number of sites is set to a value equal to M+1.

In step 411 a topology $T_x$ comprising X sites is identified,

In step 413 the number (Y) of concurrent demand requests to be provisioned on each of the X sites is calculated. For example if the concurrent demand requests were concurrent calls then the number of concurrent calls to be provisioned in each of the X sites would be Y=CC/(X−M).

In step 415 for the topology $T_x$ a subset $S_x$ of the set of N sites having available capacity to provision the number of concurrent demand requests to be provisioned in each of the X sites is identified.

In step 417 a determination is made whether X is equal to N. If X is not equal to N in the method proceeds to step 419.

In step 419 the value of X is incremented by one and the method repeats steps 411 through 417.

If X is equal to N, then the subset $S_x$ corresponding to the largest value of X is selected as the set of allocable sites for the concurrent demand requests (e.g. Y concurrent calls) to be provisioned.

In step 423 the method provisions the concurrent demand requests (e.g. concurrent calls) to the allocable sites.

Figure 5:
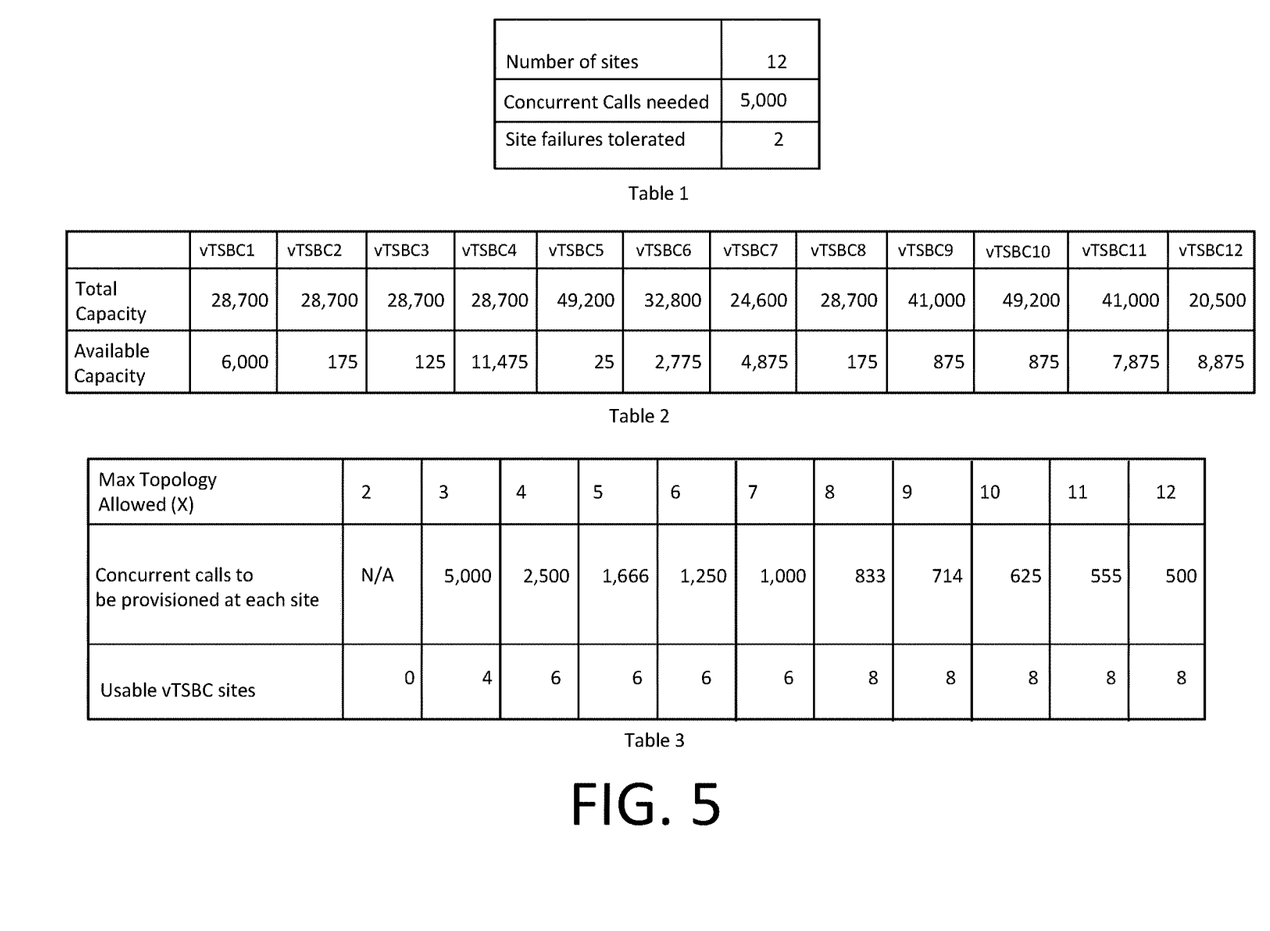
FIG. 5 is a set of tables illustrating an example of a method for of a method for allocating customers to network elements.

Illustrated in table 1 of FIG. 5 is an example of call allocation in a network having 12 vTSBC sites (N=12). In this example, the number of concurrent call (CC) needed is 5,000 and the number of site failures tolerated is 2 (M=2). Table 2 of FIG. 5 sets out the total capacity for each site and the available capacity for each site. For example vTSBC1 has a total capacity of 28,700 calls but an available capacity of only 6,000 calls, Table 3 of FIG. 5 sets out the maximum topology allowed (X), the concurrent calls to be provisioned at each site (CC/(X−M) for each value of X, and the number of available sites that can accommodate the number of concurrent calls to be provisioned at each site. For example, for X=3, the number of calls Y to be provisioned at each site is equal to CC/(X−M) or 5,000. The number of sites with capacity greater than 5,000 is 4, namely vTSBC 1 (6,000), vTSBC 4 (11,475), vTSBC 11 (7,875) and vTSBC 12 (8,875). For X=5, the number of concurrent calls Y to be provisioned at each site is 1,666 and there are 6 sites that can accommodate that demand. Those sites are vTSBC 1, vTSBC 4, vTSBC 6, vTSBC 7, vTSBC 11 and vTSBC 12.

As shown in table 3, the subset of sites that can accommodate number of concurrent calls to be provisioned at each site for the largest value of X (X=12) comprises vTSBC 1, vTSBC 4, vTSBC 6, vTSBC 7, vTSBC 9, vTSBC 10, vTSBC 11 and vTSBC 12. The concurrent call would then be allocated to the sites in the subset $S_{12}$ of the set of N sites.

There are two major reasons why highest value for X is desired. The over-provisioning, which is required to allow the service to tolerate failures, is reduced thus introducing cost savings. In case of an unusual failure scenario the impact to the customer is reduced. To further clarify: a 5 Network-Element (NE) topology is selected for a customer. If the topology was designed to tolerate single-failure each of the NEs carries 25% of the customer offered load. If an unusual event takes place which causes 2 NEs, in two different geographical locations, to go down simultaneously, the customer will lose 25% of his capabilities. If now the same customer was deployed on a 21 NE topology each NE would carry 5% of the load. If the unusual event causes two NEs to go down the customer loses only 5% of its capability. Spare capacity in the NE may be able to find that extra 5% needed capacity since not all users use the NE at the same time etc. It would be much more difficult for that NE to find 25% extra capacity.

The proposed customer allocation methodology supports either double-failure or single failure scenarios. These two approaches may be shared on same vTSBC. From the vTSBCs capacity point of view the two approaches will result in different CC allocations per customer on a specific vTSBC.

When an environment is new it may be necessary to allocate customers assuming that double-failure is likely. Currently, the relatively long maintenance periods required for OpenStack Controller in integrated cloud nodes may lead to double-failure events. However, as environments mature their reliability is typically increased. It may be advantageous, at that point in time, to move customers from double-failure to single-failure scenarios and free-up capacity thus realizing significant savings.

The proposed customer allocation Methodology can easily address such a move. The move will simply result in updates to a Currently_Available table. There will be no other effect on the customer and the customer does not need to be notified. The capacity gained, and as a result monetary savings, will be significant.

In an embodiment each site may have 2 LCP regions. Hence there may be 2*N LCP regions in a network. To achieve maximum reliability it is best to deploy one vTSBC in an LCP Region. In other words, deploy new vTSBCs only in sites where they were not deployed before. This deployment process is executed until there are N vTSBCs deployed. To run the Customer Allocation methodology successfully, the methodology should only be run on these N LCP sites in one search cycle. In other words, the search should be confined to a vector of N vTSBC-Sites.

At some point the capacity of the first N vTSBCs will be exhausted requiring deployment of new vTSBCs. In other words, $vTSBC_{N+1}$ will have to be deployed in an LCP that already has one previously deployed vTSBC. But, if two vTSBCs are deployed in same LCP Region and allocated to the same customer—a double failure can occur even when only one LCP Region fails. To avoid this scenario from happening it is essential to allocate customers to vTSBCs in a way that will prevent allocating a customer to two vTSBCs which happen to reside in same LCP region.

The approach proposed is this: deploy $vTSBC_{N+1}$ thru $vTSBC_{N+J}$ and record it in the database as a second vector of N×1 vTSBCs. When utilizing the customer allocation methodology the methodology may be applied to one row (i.e. vector) at a time. In other words, a customer can be allocated onto N vTSBCs as long as these vTSBCs belong to same vector. This approach guarantees that two, or more, vTSBCs in same LCP region will NOT be allocated to the same customer.

The methods described in the examples may be embodied directly in hardware, in a software module executed by a processor, or in a combination of the two. A software module may reside in any form of memory or storage medium such as RAM memory, flash memory, ROM memory, EPROM memory, EEPROM memory, registers, hard disk, a removable disk, a CD-ROM. The memory or storage medium may be coupled to the processor such that the processor can read information from, and write information to, the memory or storage medium. Alternatively, the storage medium may be integral to the processor. The processor and the storage medium may reside in an ASIC. In some aspects, the steps and/or actions of a method may reside as one or any combination or set of codes and/or instructions on a machine readable medium and/or computer readable medium, which may be incorporated into a computer program product.

In any of the exemplary embodiments, the described functions may be implemented in hardware, software, firmware, or any combination thereof. Functions implemented in software may be stored on or transmitted over as instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed:

1. A method comprising:
    (a) in a network having a set of N sites, determining a value of N;
    (b) determining a value CC for a number of concurrent demand requests to be provisioned in the network;
    (c) determining a currently available capacity of each site of the set of N sites;
    (d) determining a number M of site failures to be tolerated;
    (e) Setting a value for a variable X corresponding to a number of sites, where X is equal to M+1 and where X<=N;
    (f) identifying a topology Tx comprising X sites;
    (g) calculating a value Y corresponding to the number of concurrent demand requests to be provisioned on each of the X sites where Y=CC/(X−M);
    (h) identifying for the topology Tx a subset Sx of the set of N sites having available capacity to provision Y concurrent demand requests;
    (i) if X<N, incrementing X by one and repeating steps (f) though (h);
    (j) if X is equal to N then selecting the subset Sx corresponding with a largest value of X as allocable sites for the Y concurrent demand requests; and
    (k) provisioning the Y concurrent demand requests to each of the allocable sites.

2. The method of claim 1 wherein the concurrent demand requests are calls.

3. The method of claim 1 wherein M is equal to 1.

4. The method of claim 1 wherein M is equal to 2.

5. The method of claim 1 wherein each site is associated with a network element.

6. The method of claim 5 wherein the network element comprises a virtual Trunking Session Border Controller (vTSBC).

7. The method of claim 5 where the network element comprises sector switching centers (SSCs) and mobile switching centers (MSCs).

8. A system comprising: a processor;
    a non-transitory computer-readable medium in communication with the processor wherein the processor is configured to execute an application stored in the non-transitory computer-readable medium for performing operations comprising:
    (a) in a network having a set of N sites, determining a value of N;
    (b) determining a value CC for a number of concurrent demand requests to be provisioned in the network;
    (c) determining a currently available capacity of each site of the set of N sites;
    (d) determining a number M of site failures to be tolerated;
    (e) Setting a value for a variable X corresponding to a number of sites where X=M+1 and where X<=N;
    (f) identifying a topology Tx comprising X sites;
    (g) calculating a value Y corresponding to the number of concurrent demand requests to be provisioned on each of the X sites where Y=CC/(X−M);
    (h) identifying for the topology Tx a subset Sx of the set of N sites having available capacity to provision Y concurrent demand requests;
    (i) if X<N, incrementing X by one and repeating steps (f) though (h);
    (j) if X is equal to N then selecting the subset Sx corresponding with a largest value of X as allocable sites for the Y concurrent demand requests to be provisioned; and
    (k) provisioning the Y concurrent demand requests to each of the allocable sites.

9. The system of claim 8 wherein the concurrent demand requests are calls.

10. The system of claim 8 wherein M is equal to 1.

11. The system of claim 8 wherein M is equal to 2.

12. The system of claim 8 wherein each site is associated with a network element.

13. The system of claim 12 wherein the network element comprises a vTSBC.

14. The system of claim 12 where the network element comprises SSCs and MSCs.

15. A non-transitory computer readable medium comprising computer executable instructions embodied in a computer readable medium and when executed by a processor of a computer performs steps comprising:
    (a) in a network having a set of N sites, determining a value of N;

(b) determining a value CC for a number of concurrent demand requests to be provisioned in the network;

(c) determining a currently available capacity of each site of the set of N sites;

(d) determining a number M of site failures to be tolerated;

(e) Setting a value for a variable X corresponding to a number of sites where X=M+1 and where X<=N;

(f) identifying a topology Tx comprising X sites;

(g) calculating a value Y corresponding to the number of concurrent demand requests to be provisioned on each of the X sites where Y=CC/(X−M);

(h) identifying for the topology Tx a subset Sx of the set of N sites having available capacity to provision Y concurrent demand requests;

(i) if X<N, incrementing X by one and repeating steps (f) though (h);

(j) if X is equal to N then selecting the subset Sx corresponding with a largest value of X as allocable sites for the Y concurrent demand requests to be provisioned; and (k) provisioning the Y concurrent demand requests to each of the allocable sites.

16. The non-transitory computer readable medium of claim 15 wherein M is equal to 1.

17. The non-transitory computer readable medium of claim 15 wherein M is equal to 2.

18. The non-transitory computer readable medium of claim 15 wherein each site is associated with a network element.

19. The non-transitory computer readable medium of claim 18 wherein the network element comprises a vTSBC.

20. The non-transitory computer readable medium of claim 18 wherein the network element comprises SSCs and MSCs.

\* \* \* \* \*